(12) United States Patent
Takada et al.

(10) Patent No.: US 7,968,183 B2
(45) Date of Patent: *Jun. 28, 2011

(54) HARD-COATED FILM, METHOD OF MANUFACTURING THE SAME, OPTICAL DEVICE, AND IMAGE DISPLAY

(75) Inventors: Katsunori Takada, Ibaraki (JP); Hiroyuki Takao, Ibaraki (JP); Seiichi Kusumoto, Ibaraki (JP); Daisuke Hamamoto, Ibaraki (JP); Takayuki Shigematsu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1057 days.

This patent is subject to a terminal disclaimer.

(21) Appl. No.: 11/727,394

(22) Filed: Mar. 26, 2007

(65) Prior Publication Data
US 2007/0237966 A1 Oct. 11, 2007

(30) Foreign Application Priority Data

Mar. 28, 2006 (JP) ................. 2006-087133
Sep. 4, 2006 (JP) ................. 2006-239137

(51) Int. Cl.
*B32B 27/30* (2006.01)
*B32B 27/40* (2006.01)
*B32B 5/16* (2006.01)

(52) U.S. Cl. ............. 428/331; 428/425.5; 428/451

(58) Field of Classification Search .......... 428/331, 428/425.5, 451
See application file for complete search history.

(56) References Cited

U.S. PATENT DOCUMENTS

| 5,909,314 | A | 6/1999 | Oka et al. |
| 5,914,073 | A | 6/1999 | Kobayashi et al. |
| 6,064,524 | A | 5/2000 | Oka et al. |
| 6,329,041 | B1 | 12/2001 | Tsuchiya et al. |
| 6,340,404 | B1 | 1/2002 | Oka et al. |

(Continued)

FOREIGN PATENT DOCUMENTS
EP 0667541 A2 8/1995
(Continued)

OTHER PUBLICATIONS

Taiwanese Office Action dated Jan. 14, 2011, issued in corresponding Taiwanese Patent Application No. 096110819.

*Primary Examiner* — D. S Nakarani
(74) *Attorney, Agent, or Firm* — Westerman, Hattori, Daniels & Adrian, LLP

(57) ABSTRACT

A hard-coating layer is formed on at least one surface of a transparent plastic film substrate using a material for forming a hard-coating layer. The material contains Components A, B, and C. Component A is at least one of urethane acrylate and urethane methacrylate. Component B is at least one of polyol acrylate and polyol methacrylate. Component C is a polymer containing a repeating unit represented by General Formula 1 indicated below.

(1)

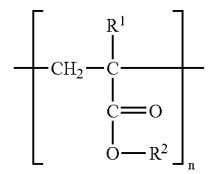

11 Claims, 1 Drawing Sheet

U.S. PATENT DOCUMENTS

| | | |
|---|---|---|
| 6,562,440 B1 | 5/2003 | Tsuchiya et al. |
| 6,873,387 B2 | 3/2005 | Hokazono et al. |
| 7,037,573 B2 | 5/2006 | Miyatake et al. |
| 7,332,213 B2 | 2/2008 | Mimura et al. |
| 7,371,439 B2 | 5/2008 | Matsunaga et al. |
| 7,390,099 B2 * | 6/2008 | Takao et al. ............ 359/601 |
| 2001/0050741 A1 | 12/2001 | Hokazono et al. |
| 2005/0008863 A1 | 1/2005 | Mimura et al. |
| 2005/0096431 A1 | 5/2005 | Fujii et al. |
| 2006/0052565 A1 | 3/2006 | Yoshioka et al. |
| 2006/0057307 A1 | 3/2006 | Matsunaga et al. |
| 2008/0057262 A1 | 3/2008 | Ooishi et al. |
| 2008/0182038 A1 | 7/2008 | Matsunaga et al. |

FOREIGN PATENT DOCUMENTS

| | | |
|---|---|---|
| EP | 0761788 A1 | 3/1997 |
| EP | 1160591 A1 | 12/2001 |
| EP | 1249716 A1 | 10/2002 |
| JP | 7-287102 A | 10/1995 |
| JP | 9-113728 A | 5/1997 |
| JP | 11-286083 A | 10/1999 |
| JP | 11300873 A | 11/1999 |
| JP | 2000-052472 A | 2/2000 |
| JP | 2000-233611 A | 8/2000 |
| JP | 2000-326447 A | 11/2000 |
| JP | 2001-194504 A | 7/2001 |
| JP | 2001-264508 A | 9/2001 |
| JP | 2001-343529 A | 12/2001 |
| JP | 2003-004903 A | 1/2003 |
| JP | 2004-123780 A | 4/2004 |
| JP | 2004-167827 A | 6/2004 |
| JP | 2004-203683 A | 7/2004 |
| JP | 2005-122147 A | 5/2005 |
| JP | 2005-186576 A | 7/2005 |
| JP | 2005-227407 A | 8/2005 |
| JP | 2005-275225 A | 10/2005 |
| JP | 2005-309401 A | 11/2005 |
| JP | 2006-30837 A | 2/2006 |
| JP | 2006-058574 A | 3/2006 |
| JP | 2006-078538 A | 3/2006 |
| KR | 10-1996-0010731 A | 4/1996 |
| KR | 10-2000-0021809 A | 4/2000 |
| KR | 10-2006-0072072 A | 6/2006 |
| KR | 10-2006-0060069326 A | 6/2006 |
| TW | 200405030 | 4/2004 |
| TW | 200505677 A | 2/2005 |
| TW | 200604596 A | 2/2006 |
| WO | 95/31737 A1 | 11/1995 |
| WO | 2005098480 A1 | 10/2005 |

* cited by examiner

HARD-COATED FILM, METHOD OF MANUFACTURING THE SAME, OPTICAL DEVICE, AND IMAGE DISPLAY

FIELD OF THE INVENTION

The present invention relates generally to a hard-coated film, a method of manufacturing the same, an optical device, and an image display.

BACKGROUND OF THE INVENTION

With technical improvement in recent years, liquid crystal displays (LCDs), plasma display panels (PDPs), electroluminescence displays (ELDs), etc. have been developed in addition to conventional cathode ray tubes (CRTs) as image displays and have been used practically. As LCDs have been technically improved to provide wide viewing angles, high resolution, high response, good color reproduction, and the like, applications of LCDs are spreading from laptop personal computers and monitors to television sets. In a basic LCD structure, a pair of flat glass substrates each provided with a transparent electrode are opposed via a spacer to form a constant gap, between which a liquid crystal material is placed and sealed to form a liquid crystal cell, and a polarizing plate is formed on the outside surface of each of the pair of glass substrates. In a conventional technique, a glass or plastic cover plate is attached to the surface of the liquid crystal cell in order to prevent scratches on the polarizing plate bonded to the surface of the liquid crystal cell. However, the placement of such a cover plate is disadvantageous in terms of cost and weight. Thus, a hard coating process has gradually been used to treat the surface of polarizing plates.

For the hard coating process, a hard-coated film is generally used in which a thin hard-coating layer with a thickness of 2 to 3 μm has been formed on one or both surfaces of a transparent plastic film substrate. Generally, the hard-coating layer is formed using resins for forming a hard-coating layer such as thermosetting resins or ultraviolet(UV)-curable resins. If such resins are applied to a glass plate to form the hard-coating layer, it can exhibit a pencil hardness of 4H or more. If a hard-coating layer with an insufficient thickness is formed on a transparent plastic film substrate, however, the pencil hardness of the layer can be generally affected by the substrate and reduced to 3H or less.

LCD applications have come to include home television sets, and thus it is easily expected that the users of general home television sets should handle LCD television sets in the same manner as in the case of conventional glass CRT television sets. Glass CRTs have a pencil hardness of about 9H. Thus, hard-coated films to be used for LCDs have been required to have higher hardness.

An increase in the hardness of hard-coated films is possible by increasing the thickness of their hard-coating layer. However, such an increase in thickness causes cracking of the hard-coating layer or curling due to hardening and shrinking of the hard-coating layer. In order to overcome these problems, techniques have been proposed, as disclosed in Japanese Patent Application Laid-Open (JP-A) Nos. 09-113728, 11-300873, 2000-52472, and 07-287102.

JP-A No. 09-113728 discloses a protective film for polarizing plates, which includes a transparent resin film and a coating layer formed on at least one surface of the transparent resin film by curing a composition containing a UV-curable polyol (meth)acrylate resin. It also discloses that the UV-curable polyol (meth)acrylate resin may be dipentaerythritol acrylate. According to JP-A No. 09-113728, the cured coating layer with a thickness of 10 μm or more can provide a pencil hardness of 4H or more, if it is formed of a resin whose main component is dipentaerythritol acrylate. It also discloses that if an epoxy resin is additionally used, curling due to hardening and shrinking can be reduced. According to the invention as disclosed in JP-A No. 09-113728, however, it is difficult to sufficiently reduce curling.

JP-A No. 11-300873 discloses a hard-coated film, which includes a film of a plastic base material, a buffer monolayer or multilayer with a thickness of 3 to 50 μm formed on at least one surface of the film, and a hard-coating layer with a thickness of 3 to 15 μm formed on the buffer layer. JP-A No. 11-300873 also discloses that the hard-coated film as a whole has a pencil hardness of 4H to 8H. However, when the two-layer structure is employed that is composed of the buffer layer and the hard-coating layer, there is a problem in that the number of manufacturing steps increases, and thereby the production efficiency decreases.

JP-A No. 2000-52472 discloses a hard-coated film including a substrate and a cured resin coating layer that is formed by a process including the steps of forming, on the substrate, a first hard-coating layer of a cured resin that contains inner cross-linked inorganic or organic ultrafine particles and then forming a second hard-coating layer of a thin clear cured resin film that is free of inner cross-linked inorganic or organic ultrafine particles. Like the invention as disclosed in JP-A No. 11-300873, however, when the two-layer structure including the first and second hard-coating layers is employed for the cured resin coating layer, there also is a problem in that the number of manufacturing steps increases, and thereby the production efficiency decreases.

JP-A No. 07-287102 discloses an antireflection film including a transparent substrate film and a hard-coating layer and a low-refractive-index layer that are formed on at least one of the front and back surfaces of the transparent substrate film. It also discloses that solvent-drying type resins may be used as a material for the hard-coating layer. If a reactive group-free polymer is added, hardening and shrinking that occur when ionizing radiation-curable resins or the like are cured are prevented and thereby curling can be effectively reduced. However, the addition of such a polymer has a problem in which sufficiently high surface hardness is difficult to obtain.

SUMMARY OF THE INVENTION

An object of the present invention is to provide a hard-coated film, a method of manufacturing the same, and an optical device and an image display each including the same. The hard-coated film has a sufficiently high hardness, allows a hard-coating layer to be prevented from cracking, is prevented from curling that is caused by hardening and shrinking of the hard-coating layer, and can be manufactured easily.

In order to achieve the aforementioned object, a hard-coated film of the present invention includes a transparent plastic film substrate and a hard-coating layer formed on at least one surface of the transparent plastic film substrate. The hard-coating layer is formed using a material for forming the hard-coating layer (hereinafter also referred to as a "hard-coating material") containing Component A, Component B, and Component C described below:

Component A: at least one of urethane acrylate and urethane methacrylate;

Component B: at least one of polyol acrylate and polyol methacrylate; and

Component C: a polymer or copolymer that is formed of at least one of Components C1 and C2 described below, or a mixed polymer of the polymer and the copolymer, Component C1: alkyl acrylate having an alkyl group containing at least one of a hydroxyl group and an acryloyl group, and Component C2: alkyl methacrylate having an alkyl group containing at least one of a hydroxyl group and an acryloyl group.

A manufacturing method of the present invention is a method of manufacturing a hard-coated film including a transparent plastic film substrate and a hard-coating layer formed on at least one surface of the transparent plastic film substrate. The method includes: preparing a material for forming the hard-coating layer containing Component A, Component B, and Component C described below that have been dissolved or dispersed in a solvent; forming a coating film by applying the material for forming the hard-coating layer onto at least one surface of the transparent plastic film substrate, and forming a hard-coating layer by curing the coating film.

Component A: at least one of urethane acrylate and urethane methacrylate

Component B: at least one of polyol acrylate and polyol methacrylate

Component C: a polymer or copolymer that is formed of at least one of

Components C1 and C2 described below, or a mixed polymer of the polymer and the copolymer Component C1: alkyl acrylate having an alkyl group containing at least one of a hydroxyl group and an acryloyl group Component C2: alkyl methacrylate having an alkyl group containing at least one of a hydroxyl group and an acryloyl group An optical device of the present invention includes an optical component and a hard-coated film of the present invention formed on at least one surface of the optical component.

An image display of the present invention includes a hard-coated film of the present invention or an optical device of the present invention.

The aforementioned three components function conjointly to allow the hard-coated film of the present invention to have a sufficiently high hardness, to prevent the hard-coating layer from cracking, to prevent the hard-coated film from curling due to hardening and shrinking of the hard-coating layer, and to allow the hard-coated film to be manufactured easily. The hard-coating material contains Component A, which can impart elasticity and flexibility to the hard-coating layer to be formed, for example. Since the hard-coating material contains Component B, the hard-coating layer to be formed can have a sufficiently high hardness and high scratch resistance, for example. Since the hard-coating material contains Component C, hardening and shrinking are alleviated during the formation of the hard-coating layer and thereby curling can be inhibited, for example. In the hard-coated film of the present invention, even a single hard-coating layer has a sufficiently high hardness, can be prevented from cracking, and can prevent curling that is caused by hardening and shrinking of the hard-coating layer. Hence, in the hard-coated film of the present invention, the number of manufacturing steps can be reduced and the manufacture thereof is facilitated. The functions and effects of the respective components are described as mere examples and therefore the descriptions do not limit the present invention. As described later, in the present invention, the hard-coating layer can have a multilayer structure in which at least two layers are stacked together.

DESCRIPTION OF THE EMBODIMENTS

Figure 1:
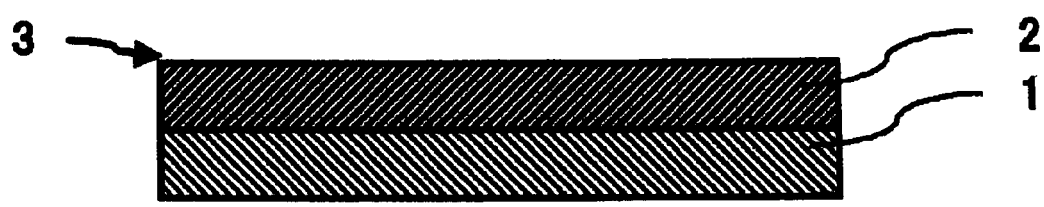
FIG. 1 is a cross-sectional view schematically showing the structure of a hard-coated film according to one embodiment of the present invention.

In the hard-coated film and the method of manufacturing the same of the present invention, it is preferable that Component B contain at least one of pentaerythritol triacrylate and pentaerythritol tetraacrylate. This is because it allows sufficiently high hardness and flexibility to be maintained while curling can be prevented from occurring more effectively.

In the hard-coated film and the method of manufacturing the same of the present invention, it is preferable that Component C contain a polymer or copolymer containing a repeating unit represented by General Formula (1) indicated below, or a mixture of the polymer and the copolymer. This is because curling can be prevented from occurring more effectively.

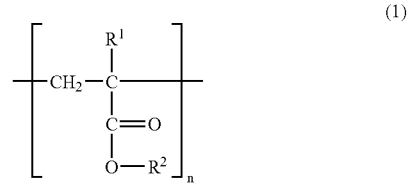

(1)

In General Formula (1), $R^1$ denotes —H or —$CH_3$, $R^2$ denotes —$CH_2CH_2OX$ or a group that is represented by General Formula (2) indicated below, and the 5x denotes —H or an acryloyl group that is represented by General Formula (3) indicated below.

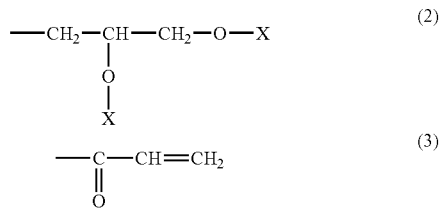

In General Formula (2), the X denotes —H or an acryloyl group that is represented by General Formula (3), and Xs are identical to or different from each other.

In order to provide the hard-coated film of the present invention with antiglare properties, the outer surface of the hard coating layer can have an uneven structure. The uneven structure can be formed by adding fine particles to the hard coating material, for example.

In the hard-coated film of the present invention, in order to reduce the reflection of light at the interface between the hard-coating layer and air, an antireflection layer can be formed on the outer surface of the hard-coating layer. When a hard-coated film provided with an antireflection layer is used, for example, in an image display, it is possible to improve the visibility of images on the display screen.

Preferably, the antireflection layer contains a siloxane oligomer and a fluorine compound. The siloxane oligomer has an ethylene glycol-equivalent number average molecular weight of 500 to 10000. The fluorine compound has a polystyrene-equivalent number average molecular weight of at least 5000 and has a fluoroalkyl structure and a polysiloxane structure. This is because the antireflection layer that contains a siloxane oligomer and a fluorine compound having a fluoroalkyl structure and a polysiloxane structure can be cured through the reaction between the siloxane oligomer and the polysiloxane structure, so that the scratch resistance of the antireflection layer to be formed can be improved. If the siloxane oligomer has a number average molecular weight of 500 or more, the material for forming the antireflection layer can be prevented from gelling and thereby the material can have good coating properties and storage stability. If the number average molecular weight of the siloxane oligomer is 10000 or less, the antireflection layer can have high scratch resistance.

The antireflection layer preferably contains hollow spherical silicon oxide ultrafine particles.

In the hard-coated film and the method of manufacturing the same according to the present invention, the material for forming the hard-coating layer preferably contains a leveling agent.

In the method of manufacturing the hard-coated film of the present invention, the solvent preferably contains ethyl acetate. This is because such a solvent allows the production of a hard-coating layer with good adhesion to the transparent plastic film substrate, and thereby the hard-coating layer can be prevented from detaching. Preferably, the content of the ethyl acetate is at least 20% by weight with respect to the whole solvent.

Next, the present invention is described in detail. The present invention, however, is not limited by the following description.

The hard-coated film of the present invention includes a transparent plastic film substrate and a hard-coating layer formed on one or both surfaces of the transparent plastic film substrate.

The transparent plastic film substrate is not particularly limited. Preferably, the transparent plastic film substrate has a high visible-light transmittance (preferably a light transmittance of at least 90%) and good transparency (preferably a haze value of at most 1%). Examples of the material for forming the transparent plastic film substrate include polyester type polymers, cellulose type polymers, polycarbonate type polymers, acrylics type polymers, etc. Examples of the polyester type polymers include polyethylene terephthalate, polyethylenenaphthalate, etc. Examples of the cellulose type polymers include diacetyl cellulose, triacetyl cellulose (TAC), etc. Examples of the acrylic type polymers include poly methylmethacrylate, etc. Examples of the material for forming the transparent plastic film substrate also include styrene type polymers, olefin type polymers, vinyl chloride type polymers, amide type polymers, etc. Examples of the styrene type polymers include polystyrene, acrylonitrile-styrene copolymer, etc. Examples of the olefin type polymers include polyethylene, polypropylene, polyolefin that has a cyclic or norbornene structure, ethylene-propylene copolymer, etc. Examples of the amide type polymers include nylon, aromatic polyamide, etc. The material for forming the transparent plastic film substrate also contain, for example, imide type polymers, sulfone type polymers, polyether sulfone type polymers, polyether-ether ketone type polymers, poly phenylene sulfide type polymers, vinyl alcohol type polymer, vinylidene chloride type polymers, vinyl butyral type polymers, allylate type polymers, polyoxymethylene type polymers, epoxy type polymers, blend polymers of the above-mentioned polymers, etc. Among them, those having small optical birefringence are used suitably. The hard-coated film of the present invention can be used as a protective film for a polarizing plate, for example. In such a case, the transparent plastic film substrate is preferably a film formed of triacetyl cellulose, polycarbonate, an acrylic polymer, a polyolefin having a cyclic or norbornene structure, etc. In the present invention, the transparent plastic film substrate may be a polarizer itself. Such a structure does not need a protective layer of TAC or the like and provides a simple polarizing plate structure, thus allowing a reduction in the number of steps for manufacturing polarizing plates or image displays and an increase in production efficiency. In addition, such a structure can provide thinner polarizing plates. When the transparent plastic film substrate is a polarizer, the hard-coating layer serves as a protective layer in a conventional manner. In such a structure, the hard-coated film also functions as a cover plate, when attached to the surface of a liquid crystal cell.

In the present invention, the thickness of the transparent plastic film substrate is not particularly limited. For example, the thickness is preferably 10 to 500 µm, more preferably 20 to 300 µm, and most suitably 30 to 200 µm, in terms of strength, workability such as handling property, and thin layer property. The refractive index of the transparent plastic film substrate is not particularly limited. The refractive index is, for example, 1.30 to 1.80, preferably 1.40 to 1.70.

The hard-coating layer is formed using the material for forming the hard-coating layer containing Component A, Component B, and Component C described below:

Component A: at least one of urethane acrylate and urethane methacrylate;

Component B: at least one of polyol acrylate and polyol methacrylate; and

Component C: a polymer or copolymer that is formed of at least one of

Components C1 and C2 described below, or a mixed polymer of the polymer and the copolymer, Component C1: alkyl acrylate having an alkyl group containing at least one of a hydroxyl group and an acryloyl group, and Component C2: alkyl methacrylate having an alkyl group containing at least one of a hydroxyl group and an acryloyl group.

Examples of the urethane acrylate and urethane methacrylate of Component A include those containing constituents such as acrylic acid, methacrylic acid, acrylic acid ester, methacrylic acid ester, a polyol, and a diisocyanate. For example, at least one of the urethane acrylate and urethane methacrylate can be produced by using a polyol and at least one monomer selected from acrylic acid, methacrylic acid, acrylic acid ester, and methacrylic acid ester, preparing at least one of a hydroxyacrylate having at least one hydroxyl group and a hydroxymethacrylate having at least one hydroxyl group, and allowing it to react with a diisocyanate. In Component A, one type of urethane acrylate or urethane methacrylate may be used alone, or two types or more of them may be used in combination.

Examples of the acrylic acid ester include alkyl acrylates, cycloalkyl acrylates, etc. Examples of the alkyl acrylates include methyl acrylate, ethyl acrylate, isopropyl acrylate, butyl acrylate, etc. Examples of the cycloalkyl acrylates include cyclohexyl acrylate, etc. Examples of the methacrylic acid ester include alkyl methacrylates, cycloalkyl methacrylates, etc. Examples of the alkyl methacrylates include methyl methacrylate, ethyl methacrylate, isopropyl methacrylate, butyl methacrylate, etc. Examples of the cycloalkyl methacrylates include cyclohexyl methacrylate, etc.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, trimethylolpropane, glycerin, 3-methylpentane-1,3,5-triol, pentaerythritol, dipentaerythritol, tripentaerythritol, glucoses, etc.

The diisocyanate to be used herein can be any type of aromatic, aliphatic, or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4-diphenylmethane diisocyanate, and hydrogenated derivatives thereof.

The ratio of Component A to be added is not particularly limited. The use of Component A can improve the flexibility of the resulting hard-coating layer and adhesion of the resulting hard-coating layer with respect to the transparent plastic film substrate. From such viewpoints and the viewpoint of hardness of the hard-coating layer, the ratio of Component A to be added is, for example, 15 to 55% by weight, preferably 25 to 45% by weight, with respect to the entire resin components in the hard-coating material. The term "entire resin components" denotes the total amount of Components A, B, and C, or when other resin components are used, a sum of the total amount of the aforementioned three components and the total amount of the resin components. The same applies below.

Examples of Component B include pentaerythritol diacrylate, pentaerythritol triacrylate, pentaerythritol tetraacrylate, dipentaerythritol hexaacrylate, 1,6-hexanediol acrylate, pentaerythritol dimethacrylate, pentaerythritol trimethacrylate, pentaerythritol tetramethacrylate, dipentaerythritol hexamethacrylate, 1,6-hexanediol methacrylate, etc. These can be used alone, or two or more of them can be used in combination. Preferred examples of the polyol acrylate include a monomer component containing a polymer of pentaerythritol triacrylate and pentaerythritol tetraacrylate, and a component mixture containing pentaerythritol triacrylate and pentaerythritol tetraacrylate.

The ratio of Component B to be added is not particularly limited. The ratio of Component B to be added is preferably 70 to 180% by weight and more preferably 100 to 150% by weight, with respect to the amount of Component A. When the ratio of Component B to be added is 180% by weight or less with respect to the amount of Component A, the hard-coating layer to be formed can be effectively prevented from hardening and shrinking. As a result, the hard-coated film with antiglare properties can be prevented from curling and the flexibility thereof can be prevented from deteriorating. When the ratio of Component B to be added is at least 70% by weight with respect to the amount of Component A, the hard-coating layer to be formed can have further improved hardness and improved scratch resistance. In the hard-coated film of the present invention, the scratch resistance is preferably in the range of 0 to 0.7 and more preferably in the range of 0 to 0.5. Measurement of the scratch resistance can be carried out by, for instance, the measurement method described later in the section of Examples.

In Component C, the alkyl groups of Components C1 and C2 are, for instance, alkyl groups with a carbon number of 1 to 10. The alkyl groups can be of a straight chain, or can be of a branched-chain. Examples of Component C include a polymer or copolymer containing a repeating unit represented by General Formula (1) described above, or a mixture of the polymer and the copolymer. Examples of Component C include a polymer, a copolymer, and a mixture of the polymer and the copolymer, with the polymer and a copolymer being formed of at least one monomer selected from the group consisting of 2,3-dihydroxypropyl acrylate, 2,3-diacryloyloxypropyl acrylate, 2-hydroxy-3-acryloyloxypropyl acrylate, 2-acryloyloxy-3-hydroxypropyl acrylate, 2,3-dihydroxypropyl methacrylate, 2,3-diacryloyloxypropyl methacrylate, 2-hydroxy-3-acryloyloxypropyl methacrylate, 2-acryloyloxy-3-hydroxypropyl methacrylate, 2-hydroxyethyl acrylate, 2-acryloyloxyethyl acrylate, 2-hydroxyethyl methacrylate, and 2-acryloyloxyethyl methacrylate.

The ratio of Component C to be added is not particularly limited. For instance, the ratio of Component C to be added is preferably 25 to 110% by weight and more preferably 45 to 85% by weight, with respect to the amount of Component A. When the ratio of Component C to be added is 110% by weight or lower with respect to the amount of Component A, the hard-coating material has excellent coating properties. When the ratio of Component C to be added is at least 25% by weight with respect to the amount of Component A, the hard-coating layer to be formed can be prevented from hardening and shrinking. As a result, in the hard-coated film, curling can be controlled, for example, within 30 mm or less. The degree at which curling occurs is preferably within 20 mm or less and more preferably within 10 mm or less. The evaluation of the occurrence of curling can be carried out by, for instance, the method described later in the section of Examples.

As described above, the hard-coating layer may contain fine particles to have an uneven structure at its surface. This is because when having a surface with an uneven structure, the hard-coating layer can be provided with antiglare properties. The fine particles can be inorganic or organic fine particles, for example. The inorganic fine particles are not particularly limited. Examples of the inorganic fine particles include fine particles made of silicon oxide, titanium oxide, aluminum oxide, zinc oxide, tin oxide, calcium carbonate, barium sulfate, talc, kaolin, calcium sulfate, etc. The organic fine particles are not particularly limited. Examples thereof include polymethyl methacrylate acrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, polyethylene fluoride resin powder, etc. One type of the inorganic and organic fine particles can be used alone, or two types or more of them can be used in combination.

The fine particles may have any shape. They may be in the form of approximately spherical beads or may be of an indefinite shape such as powder, for example. The fine particles may have a weight average particle size of, for instance, 1 to 30 μm, preferably 2 to 20 μm. The fine particles have preferably approximately spherical shapes, more preferably approximately spherical shapes with an aspect ratio of 1.5 or lower.

The ratio of the fine particles to be added is not particularly limited but can be determined suitably. With respect to 100 parts by weight of the hard-coating material, the ratio of the fine particles to be added is, for instance, 2 to 60 parts by weight, preferably 1 to 50 parts by weight.

From the viewpoints of preventing the occurrence of interference fringes or light scattering that is caused at the interfaces between the hard-coating layer and the fine particles, it is preferable that the difference in refractive index between the fine particles and the hard-coating layer be reduced. The interference fringes are phenomena that external light incident on the hard-coated film is reflected to produce rainbow color. Recently, three-wavelength fluorescent lamps featuring clear visibility are used frequently in offices, for example. Under the three-wavelength fluorescent lamps, the interference fringes appear conspicuously. Since the refractive index of the hard-coating layer is generally in the range of 1.4 to 1.6, the fine particles have preferably refractive indices close to the above-mentioned refractive index range. Preferably, the difference in refractive index between the fine particles and the hard-coating layer is smaller than 0.05.

The difference d in refractive index between the transparent plastic film substrate and the hard-coating layer is preferably at most 0.04. When the difference d is at most 0.04, the interference fringes can be prevented from occurring. The difference d is more preferably at most 0.02.

The thickness of the hard-coating layer is, for example, 15 to 25 μm, preferably 18 to 23 μm. When the thickness is in the aforementioned predetermined ranges, the hard-coating layer has sufficiently high hardness (for example, a pencil hardness of at least 4H). In addition, curling can be prevented from occurring further effectively, as long as the thickness is in the predetermined ranges. The thickness of the hard-coating layer whose surface has an uneven structure is, for example, in the range of 15 to 35 μm, preferably 20 to 30 μm.

The hard-coated film of the present invention can be manufactured by, for instance, preparing a material for forming the hard-coating layer containing the aforementioned three components that have been dissolved or dispersed in a solvent, forming a coating film by applying the material for forming the hard-coating layer onto at least one surface of the transparent plastic film substrate, and forming the hard-coating layer by curing the coating film.

The solvent is not particularly limited. Examples of the solvent include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone, diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone (MIBK), 2-octanone, 2-pentanone, 2-hexanone, 2-heptanone, 3-heptanone, ethylene glycol monoethyl ether acetate, ethylene glycol monoethyl ether, ethylene glycol monobutyl ether, ethylene glycol monomethyl ether, propylene glycol monomethyl ether acetate, propylene glycol monomethyl ether, etc. One of these solvents or any combination of two or more of these solvents may be used. From the viewpoint of improving the adhesion between the transparent plastic film substrate and the hard-coating layer, the solvent contains ethyl acetate whose ratio to the whole is preferably at least 20% by weight, more preferably at least 25% by weight, and most preferably 30 to 70% by weight. When the ratio of the ethyl acetate in the solvent is 70% by weight or less, the solvent can have a suitable rate of volatilization and thereby unevenness in coating or drying can be effectively prevented from occurring. The type of the solvent to be used in combination with the ethyl acetate is not particularly limited. Examples of the solvent include butyl acetate, methyl ethyl ketone, ethylene glycol monobutyl ether, propylene glycol monomethyl ether, etc.

Various types of leveling agents can be added to the hard-coating material. The leveling agent may be, for example, a fluorochemical or silicone leveling agent, preferably a silicone leveling agent. Examples of the silicon leveling agent include a reactive silicone, polydimethylsiloxane, polyether-modified polydimethylsiloxane, polymethylalkylsiloxane, etc. Among these silicone leveling agents, the reactive silicone is particularly preferred. The reactive silicone added can impart lubricity to the surface and produce continuous scratch resistance over a long period of time. In the case of using a reactive silicone containing a hydroxyl group, when an antireflection layer (a low refractive index layer) containing a siloxane component is formed on the hard-coating layer, the adhesion between the antireflection layer and the hard-coating layer is improved.

The amount of the leveling agent to be added is, for example, at most 5 parts by weight, preferably in the range of 0.01 to 5 parts by weight, with respect to 100 parts by weight of all the resin components.

If necessary, the hard-coating material may contain a pigment, a filler, a dispersing agent, a plasticizer, an ultraviolet absorbing agent, a surfactant, an antioxidant, a thixotropy-imparting agent, or the like, as long as the performance is not degraded. One of these additives may be used alone, or two or more of these additives may be used together.

The hard-coating material can contain any conventionally known photopolymerization initiator. Examples of the applicable photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, and other thioxanthone compounds.

The hard-coating material may be applied onto the transparent plastic film substrate by any coating method such as fountain coating, die coating, spin coating, spray coating, gravure coating, roll coating, bar coating, etc.

The hard-coating material is applied to form a coating film on the transparent plastic film substrate and then the coating film is cured. Preferably, the coating film is dried before being cured. The drying can be carried out by, for instance, allowing it to stand, air drying by blowing air, drying by heating, or a combination thereof.

While the coating film formed of the hard-coating material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably 50 to 5000 $mJ/cm^2$ in terms of accumulative exposure at an ultraviolet wavelength of 365 nm. When the amount of irradiation is at least 50 $mJ/cm^2$, the hard-coating material can be cured further and the resulting hard-coating layer also has a sufficiently higher hardness. When the amount of irradiation is at most 5000 mJ/cm$^2$, the resulting hard-coating layer can be prevented from being colored and thereby can have improved transparency.

As described above, a hard-coated film of the present invention can be manufactured by forming the hard-coating layer on at least one surface of the transparent plastic film substrate. The hard-coated film of the present invention can be manufactured by manufacturing methods other than that described above. The hard-coated film of the present invention has a pencil hardness of at least 4H, for example.

FIG. 1 is a cross-sectional view schematically showing an example of the hard-coated film of the present invention. As shown in FIG. 1, a hard-coated film 3 in this example includes a transparent plastic film substrate 1 and a hard-coating layer 2 formed on one surface of the transparent plastic film substrate 1. The present invention is not limited to the structure shown in FIG. 1. A hard-coated film can include a transparent plastic film substrate 1 and hard-coating layers 2, each of which is formed on each surface of the transparent plastic film substrate 1. The hard-coating layer 2 in this example is monolayer. However, the present invention is not limited to this. The hard-coating layer 2 may have a multilayer structure in which two or more layers are stacked together.

Figure 2:
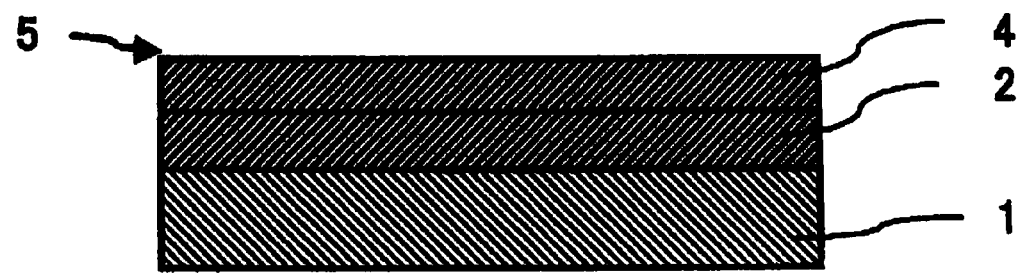
FIG. 2 is a cross-sectional view schematically showing the structure of a hard-coated film according to another embodiment of the present invention.

In the hard-coated film of the present invention, an antireflection layer (a low refractive index layer) may be formed on the hard-coating layer. FIG. 2 is a cross-sectional view schematically showing an example of a hard-coated film of the present invention including the antireflection layer. As shown in FIG. 2, a hard-coated film 5 in this example has a structure in which a hard-coating layer 2 is formed on one surface of the transparent plastic film substrate 1 and an antireflection layer 4 is formed on the hard-coating layer 2. Light incident on an object undergoes reflection at the interface, absorption and scattering in the interior, and any other phenomena repeatedly until it goes through the object and reaches the back side. For example, light reflection at the interface between air and a hard-coating layer is one of the factors in the reduction in visibility of the image on an image display equipped with the hard-coated film. The antireflection layer reduces such surface reflection. In the hard-coated film 5 shown in FIG. 2, the hard-coating layer 2 and the antireflection layer 4 are formed on one surface of the transparent plastic film substrate 1. However, the present invention is not limited to this. In a hard-coated film of the present invention, the hard-coating layer 2 and the antireflection layer 4 may be formed on both surfaces of the transparent plastic film substrate 1. In the hard-coated film 5 shown in FIG. 2, the hard-coating layer 2 and the antireflection layer 4 each are a monolayer. However, the present invention is not limited to this. The hard-coating layer 2 and the antireflection layer 4 each may have a multilayer structure in which at least two layers are stacked together.

In the present invention, the antireflection layer is a thin optical film having a strictly controlled thickness and refractive index, or a laminate including at least two layers of the thin optical films that are stacked together. In the antireflection layer, the antireflection function is produced by allowing opposite phases of incident light and reflected light to cancel each other out based on interference of light. The antireflection function should be produced in the visible light wavelength range of 380 to 780 nm, and the visibility is particularly high in the wavelength range of 450 to 650 nm. Preferably, the antireflection layer is designed to have a minimum reflectance at the center wavelength 550 nm of the range.

When the antireflection layer is designed based on interference of light, the interference effect can be enhanced by a method of increasing the difference in refractive index between the antireflection layer and the hard-coating layer. Generally, in an antireflection multilayer including two to five thin optical layers (each with strictly controlled thickness and refractive index) that are stacked together, components with different refractive indices from each other are used to form a plurality of layers with a predetermined thickness. Thus, the antireflection layer can be optically designed at a higher degree of freedom, the antireflection effect can be enhanced, and in addition, the spectral reflection characteristics can be made flat in the visible light range. Since each layer of the thin optical film must be precise in thickness, a dry process such as vacuum deposition, sputtering, CVD, etc. is generally used to form each layer.

For the antireflection multilayer, a two-layer laminate is preferred including a high-refractive-index titanium oxide layer (refractive index: about 1.8) and a low-refractive-index silicon oxide layer (refractive index: about 1.45) formed on the titanium oxide layer. A four-layer laminate is more preferable wherein a silicon oxide layer is formed on a titanium oxide layer, another titanium oxide is formed thereon, and then another silicon oxide layer is formed thereon. The formation of the antireflection layer of such a two- or four-layer laminate can evenly reduce reflection over the visible light wavelength range (for example, 380 to 780 nm).

The antireflection effect can also be produced by forming a thin monolayer optical film (an antireflection layer) on the hard-coating layer. The antireflection monolayer is generally formed using a coating method such as a wet process, for example, fountain coating, die coating, spin coating, spray coating, gravure coating, roll coating, or bar coating.

Examples of the material for forming an antireflection monolayer include: resin materials such as UV-curable acrylic resins; hybrid materials such as a dispersion of inorganic fine particles such as colloidal silica in a resin; and sol-gel materials containing metal alkoxide such as tetraethoxysilane and titanium tetraethoxide. Preferably, the material contains a fluorine group to impart anti-fouling surface properties. In terms of, for example, scratch resistance, the material preferably contains a large amount of an inorganic component, and the sol-gel materials are more preferable. Partial condensates of the sol-gel materials can be used.

The antireflection layer (the low-refractive-index layer) is preferably formed of a material that contains, as disclosed in JP-A No. 2004-167827, a siloxane oligomer with an ethylene glycol-equivalent number average molecular weight of 500 to 10000 and a fluorine compound having a polystyrene-equivalent number average molecular weight of at least 5000 and having a fluoroalkyl structure and a polysiloxane structure since both scratch resistance and low reflection can be obtained, for example.

The antireflection layer (the low-refractive-index layer) may contain an inorganic sol for increasing film strength. The inorganic sol is not particularly limited. Examples thereof include silica, alumina, magnesium fluoride, etc. Particularly, silica sol is preferred. The amount of the inorganic sol to be added is, for example, in the range of 10 to 80 parts by weight, based on 100 parts by weight of the total solids of the material for forming the antireflection layer. The size of the inorganic fine particles in the inorganic sol is preferably in the range of 2 to 50 nm, more preferably 5 to 30 nm.

The material for forming the antireflection layer preferably contains hollow spherical silicon oxide ultrafine particles. The silicon oxide ultrafine particles have preferably an average particle size of 5 to 300 nm, more preferably 10 to 200 nm. The silicon oxide ultrafine particles are in the form of hollow spheres each including a pore-containing outer shell in which a hollow is formed. The hollow contains at least one of a solvent and a gas that has been used for preparing the ultrafine particles. A precursor substance for forming the hollow of the ultrafine particle preferably remains in the hollow. The thickness of the outer shell is preferably in the range of about 1 to about 50 nm and in the range of approximately 1/50 to 1/5 of the average particle size of the ultrafine particles. The outer shell preferably includes a plurality of coating layers. In the ultrafine particles, the pore is preferably blocked, and the hollow is preferably sealed with the outer shell. This is because the antireflection layer holding a porous structure or a hollow of the ultrafine particles can have a reduced refractive index of the antireflection layer. The method of producing such hollow spherical silicon oxide ultrafine particles is preferably a method of producing silica fine particles as disclosed in JP-A No. 2000-233611, for example.

In the process of forming the antireflection layer (the low-refractive-index layer), while drying and curing may be performed at any temperature, they are performed at a temperature of, for example, 60 to 150° C., preferably 70 to 130° C., for a time period of, for instance, 1 minute to 30 minutes, preferably 1 minute to 10 minutes in view of productivity. After drying and curing, the layer may be further heated, so that a hard-coated film of high hardness including an antireflection layer can be obtained. While the heating may be performed at any temperature, it is performed at a temperature of, for example, 40 to 130° C., preferably 50 to 100° C., for a time period of, for instance, 1 minute to 100 hours, more preferably at least 10 hours in terms of improving scratch resistance. The temperature and the time period are not limited to the above range. The heating can be performed by a method using a hot plate, an oven, a belt furnace, or the like.

When the hard-coated film including the antireflection layer is attached to an image display, the antireflection layer may serve frequently as the uppermost surface and thus tends to be susceptible to stains from the external environment. Stains are more conspicuous on the antireflection layer than on, for instance, a simple transparent plate. In the antireflection layer, for example, deposition of stains such as fingerprints, thumbmarks, sweat, and hairdressings changes the surface reflectance, or the deposition stands out whitely to make the displayed content unclear. Preferably, an antistain layer formed of a fluoro-silane compound, a fluoro-organic compound, or the like is layered on the antireflection layer in order to impart the functions of antideposition and easy elimination of the stains.

With respect to the hard-coated film of the present invention, it is preferable that at least one of the transparent plastic film substrate and the hard-coating layer be subjected to a surface treatment. When the surface treatment is performed on the transparent plastic film substrate, adhesion thereof to the hard-coating layer, the polarizer, or the polarizing plate further improves. When the surface treatment is performed on the hard-coating layer, adhesion thereof to the antireflection layer, the polarizer, or the polarizing plate further improves. The surface treatment can be, for example, a low-pressure plasma treatment, an ultraviolet radiation treatment, a corona treatment, a flame treatment, or an acid or alkali treatment. When a triacetyl cellulose film is used for the transparent plastic film substrate, an alkali treatment is preferably used as the surface treatment. This alkali treatment can be carried out by allowing the surface of the triacetyl cellulose film to come into contact with an alkali solution, washing it with water, and drying it. The alkali solution can be a potassium hydroxide solution or a sodium hydroxide solution, for example. The normal concentration (molar concentration) of the hydroxide ions of the alkali solution is preferably in the range of 0.1 N (mol/L) to 3.0 N (mol/L), more preferably 0.5 N (mol/L) to 2.0 N (mol/L).

In a hard-coated film including the transparent plastic film substrate and the hard-coating layer formed on one surface of the transparent plastic film substrate, for the purpose of preventing curling, the surface opposite to the surface with the hard-coating layer formed thereon may be subjected to a solvent treatment. The solvent treatment can be carried out by allowing the transparent plastic film substrate to come into contact with a dissolvable or swellable solvent. With the solvent treatment, the transparent plastic film substrate can have a tendency to curl toward the other surface, which can cancel the force allowing the transparent plastic film substrate with the hard-coating layer to curl toward the hard-coating layer side and thus can prevent curling. Similarly, in the hard-coated film including the transparent plastic film substrate and the hard-coating layer formed on one surface of the transparent plastic film substrate, for the purpose of preventing curling, a transparent resin layer may be formed on the other surface. The transparent resin layer is, for example, a layer that is mainly composed of a thermoplastic resin, a radiation-curable resin, a thermo-setting resin, or any other reactive resin. In particular, the layer mainly composed of a thermoplastic resin is preferred.

The transparent plastic film substrate side of the hard-coated film of the present invention is generally bonded to an optical component for use in a LCD or ELD via a pressure-sensitive adhesive or an adhesive. Before the bonding, the transparent plastic film substrate surface may also be subjected to various surface treatments as described above.

For example, the optical component can be a polarizer or a polarizing plate. A polarizing plate including a polarizer and a transparent protective film formed on one or both surfaces of the polarizer is commonly used. If the transparent protective film is formed on both surfaces of the polarizer, the front and rear transparent protective films may be made of the same material or different materials. Polarizing plates are generally placed on both surfaces of a liquid crystal cell. Polarizing plates may be arranged such that the absorption axes of two polarizing plates are substantially perpendicular to each other.

Next, an optical device including a hard-coated film of the present invention stacked therein is described using a polarizing plate as an example. The hard-coated film of the present invention and a polarizer or polarizing plate may be laminated with an adhesive or a pressure-sensitive adhesive to form a polarizing plate having the function according to the invention.

The polarizer is not especially limited. Examples of the polarizer include: a film that is uniaxially stretched after a hydrophilic polymer film, such as a polyvinyl alcohol type film, a partially formalized polyvinyl alcohol type film, an ethylene-vinyl acetate copolymer type partially saponified film, etc., is allowed to adsorb dichromatic substances such as iodine and a dichromatic dye; and polyene type oriented films, such as a dehydrated polyvinyl alcohol film, a dehydrochlorinated polyvinyl chloride film, etc. Especially, a polarizer formed of a polyvinyl alcohol type film and a dichromatic material such as iodine is preferred because it has a high polarization dichroic ratio. Although the thickness of the polarizer is not especially limited, the thickness of about 5 to 80 μm is commonly adopted.

A polarizer that is uniaxially stretched after a polyvinyl alcohol type film is dyed with iodine can be produced by dipping and dyeing a polyvinyl alcohol type film in an aqueous solution of iodine and then stretching it by 3 to 7 times the original length. The aqueous solution of iodine may contain boric acid, zinc sulfate, zinc chloride, etc., if necessary. Separately, the polyvinyl alcohol type film may be dipped in an aqueous solution containing boric acid, zinc sulfate, zinc chloride, etc. Furthermore, before dyeing, the polyvinyl alcohol type film may be dipped in water and rinsed if needed. Rinsing the polyvinyl alcohol type film with water allows soils and blocking inhibitors on the polyvinyl alcohol type film surface to be washed off and also provides an effect of preventing ununiformity, such as unevenness of dyeing, that may be caused by swelling the polyvinyl alcohol type a film. Stretching may be applied after dyeing with iodine or may be applied concurrently with dyeing, or conversely, dyeing with iodine may be applied after stretching. Stretching can be carried out in aqueous solutions, such as boric acid, potassium iodide, etc. or in water baths.

The transparent protective film formed on one or both surfaces of the polarizer preferably is excellent in transparency, mechanical strength, thermal stability, moisture-blocking properties, retardation value stability, or the like. Examples of the material for forming the transparent protective film include the same materials as those used for the transparent plastic film substrate.

Moreover, the polymer films described in JP-A No. 2001-343529 (WO01/37007) also can be used as the transparent protective film. The polymer films described in JP-A No. 2001-343529 are formed of, for example, resin compositions including (A) thermoplastic resins having at least one of a substituted imide group and a non-substituted imide group in the side chain thereof, and (B) thermoplastic resins having at least one of a substituted phenyl group and a non-substituted phenyl group and a nitrile group in the side chain thereof. Examples of the polymer films formed of the resin compositions described above include one formed of a resin composition including: an alternating copolymer containing isobutylene and N-methyl maleimide; and an acrylonitrile-styrene copolymer. The polymer film can be produced by extruding the resin composition in the form of film. The polymer film exhibits a small retardation and a small photoelastic coefficient and thus can eliminate defects such as unevenness due to distortion when used as a protective film for a polarizing plate or the like. The polymer film also has low moisture permeability and thus has high durability against moistening.

In terms of polarizing properties, durability, and the like, cellulose resins such as triacetyl cellulose and norbornene resins are preferably used for the transparent protective film. Examples of the transparent protective film that are commercially available include FUJITAC (trade name) manufactured by Fuji Photo Film Co., Ltd., ZEONOA (trade name) manufactured by Nippon Zeon Co., Ltd., and ARTON (trade name) manufactured by JSR Corporation.

The thickness of the transparent protective film is not particularly limited. It is, for example, in the range of 1 to 500 µm in viewpoints of strength, workability such as a handling property, a thin layer property, etc. In the above range, the transparent protective film can mechanically protect a polarizer and can prevent a polarizer from shrinking and retain stable optical properties even when exposed to high temperature and high humidity. The thickness of the transparent protective film is preferably in the range of 5 to 200 µm and more preferably 10 to 150 µm.

The polarizing plate in which the hard-coated film is stacked is not particularly limited. The polarizing plate may be a laminate of the hard-coated film, the transparent protective film, the polarizer, and the transparent protective film that are stacked in this order or a laminate of the hard-coated film, the polarizer, and the transparent protective film that are stacked in this order.

Hard-coated films of the present invention and various optical devices, such as polarizing plates, including the hard-coated films can be preferably used in various image displays such as a liquid crystal display, etc. The liquid crystal display of the present invention has the same configuration as those of conventional liquid crystal displays except for including a hard-coated film of the present invention. The liquid crystal display of the present invention can be manufactured by suitably assembling several parts such as a liquid crystal cell, optical components such as a polarizing plate, and, if necessity, lighting system (for example, a backlight), and incorporating a driving circuit, for example. The liquid crystal cell is not particularly limited. The liquid crystal cell can be of any type such as TN type, STN type, $\pi$ type, etc.

In the present invention, the configurations of liquid crystal displays are not particularly limited. The liquid crystal displays of the present invention include, for example, one in which the optical device is disposed on one side or both sides of a liquid crystal cell, one in which a backlight or a reflector is used for a lighting system, etc. In these liquid crystal displays, the optical device of the present invention can be disposed on one side or both sides of the liquid crystal cell. When disposing the optical devices in both the sides of the liquid crystal cell, they may be identical to or different from each other. Furthermore, various optical components and optical parts such as a diffusion plate, an antiglare layer, an antireflection film, a protective plate, a prism array, a lens array sheet, an optical diffusion plate, backlight, etc. may be disposed in the liquid crystal displays.

EXAMPLES

Next, examples of the present invention are described together with comparative examples. However, the present invention is not limited by the following examples and comparative examples.

Example 1

A resin material (GRANDIC PC1071 (trade name), manufactured by DAINIPPON INK AND CHEMICALS, INCORPORATED) was prepared. The resin material contained a resin component containing Component A, Component B, Component C and a photopolymerization initiator in a mixed solvent of ethyl acetate and butyl acetate at a solid concentration of 66% by weight. Then 0.5% by weight of a leveling agent was added thereto. Thereafter, the resin material to which the leveling agent had been added was diluted with ethyl acetate in such a manner that butyl acetate:ethyl acetate (weight ratio)=46:54 (i.e. the ratio of ethyl acetate to the whole solvent was 54% by weight) and a solid concentration of 50% by weight was obtained. Thus a hard-coating material was prepared. The leveling agent was a copolymer having a molar ratio of dimethylsiloxane:hydroxypropylsiloxane:(6-isocyanate hexyl)isocyanuric acid: an aliphatic polyester=6.3:1.0:2.2:1.0.

Component A: urethane acrylate produced with pentaerythritol acrylate and hydrogenated xylene diisocyanate (100 parts by weight)

Component B: 49 parts by weight of dipentaerythritol hexaacrylate (hereinafter referred to as Component B1 (monomer)), 41 parts by weight of pentaerythritol tetraacrylate (hereinafter referred to as Component B4 (monomer)), and 24 parts by weight of pentaerythritol triacrylate (hereinafter referred to as Component B5 (monomer))
Component C: a polymer or copolymer having a repeating unit represented by General Formula (1) described above, or a mixture of the polymer and copolymer (59 parts by weight)
Photopolymerization initiator: Irgacure 184 (trade name, manufactured by Ciba Specialty Chemicals), 3 parts by weight.
Mixed solvent: butyl acetate:ethyl acetate (weight ratio)=89:11

The hard coating material was applied onto a transparent plastic film substrate (an 80 μm-thick triacetyl cellulose film (with a refractive index of 1.48)) with a bar coater to form a coating film. Thereafter, the coating film was dried by heating it at 100° C. for one minute. The coating film that had been dried was irradiated with ultraviolet light at an accumulated light intensity of 300 mJ/cm² using a metal halide lamp to be cured. Thus a hard-coating layer with a thickness of 20 μm was formed. In this manner, a hard-coated film according to the present example was produced.

Example 2

In this example, a hard-coated film was produced in the same manner as in Example 1 except that the thickness of the hard-coating layer was changed to 15 μm.

Example 3

In this example, a hard-coated film was produced in the same manner as in Example 1 except that the thickness of the hard-coating layer was changed to 25 μm.

Example 4

In this example, a hard-coated film was produced in the same manner as in Example 1 except that the amount of Component C to be added was changed to 96 parts by weight.

Example 5

In this example, a hard-coated film was produced in the same manner as in Example 1 except that the amount of Component C to be added was changed to 36 parts by weight.

Example 6

In this example, a hard-coated film was produced in the same manner as in Example 1 except that 30 parts by weight of crosslinked acrylic particles with an average particle size of 10 μm (trade name: MX1000, manufactured by Soken Chemical & Engineering Co., Ltd.) were added to the hard-coating material.

Example 7

In this example, a hard-coated film was produced in the same manner as in Example 1 except that an antireflection layer was formed on the hard-coating layer of the hard-coated film as obtained in Example 1.
The material for forming the antireflection layer was prepared as follows. That is, first, COLCOAT N103 (trade name, manufactured by COLCOAT Co., Ltd., with a solid content of 2% by weight) was provided as a siloxane oligomer with ethylene glycol-equivalent number average molecular weights of 500 to 10000. Subsequently, the number average molecular weight of the siloxane oligomer was measured. As a result, the number average molecular weight was 950. Next, Opstar JTA105 (trade name, manufactured by JSR Corporation, with a solid content of 5% by weight) was provided as a fluorine compound having a fluoroalkyl structure and a polysiloxane structure and polystyrene-equivalent number average molecular weights of 5000 or more. Then the number average molecular weight of the fluorine compound was measured. As a result, the polystyrene-equivalent number average molecular weight was 8000. JTA105A (trade name, manufactured by JSR Corporation, with a solid content of 5% by weight) was provided as a curing agent.

Subsequently, the material for forming the antireflection layer was prepared by mixing 100 parts by weight of Opstar JTA 105, 1 part by weight of JTA105A, 590 parts by weight of COLCOAT N103, and 151.5 parts by weight of butyl acetate. This material for forming the antireflection layer was applied onto the hard-coating layer with a die coater so as to have the same width as that of the hard-coating layer. Thereafter, it was dried and cured by heating at 120° C. for three minutes to form the antireflection layer (a low-refractive-index layer with a thickness of 0.1 μm and a refractive index of 1.43).

Example 8

In this example, a hard-coated film was produced in the same manner as in Example 7 except that the antireflection layer (95 nm in thickness) formed of the antireflection layer-forming material as described below was provided.
The antireflection layer-forming material was prepared as follows. That is, 54 parts by weight of tetraalkoxysilane, 23 parts by weight of a silane coupling agent having a fluoroalkyl structure and a polysiloxane structure, and 23 parts by weight of hollow spherical silicon oxide ultrafine particles with a diameter of 60 nm that had been surface-treated to be hydrophobized with a silane coupling agent having an acrylic group were dispersed in a mixed solvent of isopropyl alcohol/butyl acetate/methyl isobutyl ketone (54/14/32 in weight ratio) in such a manner that the solid concentration was adjusted to 2.0%.
This antireflection layer-forming material was used to form the antireflection layer on the hard-coating layer by the same method and under the same conditions as in Example 7. Thus, the hard-coated film of this example was produced.

Example 9

In this example, a hard-coated film was produced in the same manner as in Example 1 except that the thickness of the hard-coating layer was changed to 30 μm.

Example 10

In this example, a hard-coated film was produced in the same manner as in Example 1 except that the thickness of the hard-coating layer was changed to 10 μm.

Example 11

In this example, a hard-coated film was produced in the same manner as in Example 1 except that a mixed solvent was used and a hard-coating material prepared by being diluted so as to have a solid concentration of 63% by weight was used to form the hard-coating layer. The mixed solvent was composed of butyl acetate and ethyl acetate at a mixture ratio of 79:21 (i.e. the ratio of ethyl acetate to the entire solvent: 21%).

Example 12

A hard-coated film according to this example was produced in the same manner as in Example 1. The coating liquid as described below was then applied onto the triacetyl cellulose film surface that had not been hard-coated (the surface opposite to the surface where the hard-coating layer had been formed) with a wire bar so as to provide a wet thickness of 20 μm and thereby a coating film was formed. Thereafter, the coating film was dried at 80° C. for one minute. The coating liquid used herein was prepared by adding diacetyl cellulose to a mixed solvent of acetone, ethyl acetate, and isopropyl alcohol (IPA) (37:58:5) so as to have a diacetyl cellulose solid concentration of 0.5%.

Example 13

In this example, a hard-coated film was produced in the same manner as in Example 12 except that a mixed solvent of acetone, ethyl acetate, and IPA (37:58:5) was used for the coating liquid to be applied onto the triacetyl cellulose film surface that had not been hard-coated.

Example 14

In this example, a hard-coated film was produced in the same manner as in Example 1 except that the leveling agent of the reactive silicone was not added.

Example 15

In this example, a hard-coated film was produced in the same manner as in Example 1 except that a resin material (trade name: PC4-Y243, manufactured by DAINIPPON INK AND CHEMICALS, INCORPORATED) was used. The resin material contained: 100 parts by weight of urethane acrylate produced with pentaerythritol acrylate and isophorone diisocyanate (hereinafter referred to as Component A1) as Component A; 59 parts by weight of Component B1, 37 parts by weight of Component B4, and 15 parts by weight of Component B5 as Component B; 26 parts by weight of Component C; and 2 parts by weight (based on the total amount of the resin materials) of a photopolymerization initiator (Irgacure 184 (trade name)).

Example 16

In this example, a hard-coated film was produced in the same manner as in Example 1 except that a resin material (trade name: PC4-6097, manufactured by DAINIPPON INK AND CHEMICALS, INCORPORATED) was used. The resin material contained: 100 parts by weight of Component A1 as Component A; 38 parts by weight of Component B1, 40 parts by weight of Component B4, and 16 parts by weight of Component B5 as Component B; 30 parts by weight of Component C; and 3.5 parts by weight (based on the total amount of the resin components) of a photopolymerization initiator (a mixture of 1 part by weight of Irgacure 184 (trade name) and 2.5 parts by weight of 2,4,6-trimethylbenzoin phenyl phosphine oxide).

Example 17

In this example, a hard-coated film was produced in the same manner as in Example 6 except that the thickness of the hard-coating layer was changed to 29 μm.

Comparative Example 1

In this comparative example, a hard-coated film was produced in the same manner as in Example 1 except that Components A and C were not used, and Component B was a mixture of 100 parts by weight of dipentaerythritol hexaacrylate and 9 parts by weight of butanediol acrylate (hereinafter referred to as Component B3).

Comparative Example 2

In this comparative example, a hard-coated film was produced in the same manner as in Example 1 except that 22 parts by weight of Component B4 and 5 parts by weight of Component B5 were used as Component B, and 133 parts by weight of a polymethyl methacrylate acrylate polymer was used in place of Component C.

Comparative Example 3

In this comparative example, a hard-coated film was produced in the same manner as in Example 1 except that Component B was a mixture of 22 parts by weight of Component B4 and 5 parts by weight of Component B5, and 55 parts by weight of a polymethyl methacrylate acrylate polymer was used in place of Component C.

Evaluation

In the respective examples and comparative examples, various characteristics were evaluated or measured by the following methods. Thickness of Hard-Coating Layer A thickness gauge (microgauge type manufactured by Mitutoyo Corporation) was used to measure the total thickness of the hard-coated film. The thickness of the transparent plastic film substrate was subtracted from the total thickness. Thus the thickness of the hard-coating layer was calculated. The results are shown in Table 1 below.

Thickness of Antireflection Layer

An instantaneous multichannel photodetector system (MCPD-2000 (trade name) manufactured by Otsuka Electronics Co., Ltd.) was used and the thickness of the antireflection layer was calculated from the waveform data of the resulting interference spectrum.

Curling

Each hard-coated film was cut into 10 cm square pieces and thereby test pieces were prepared. The test piece was placed on a glass plate with its hard-coating layer (or antireflection layer) facing upward. The length (mm) of elevation of each of the four corners of the test piece from the glass plate was measured. The average value of the measurement values was used as an index for the evaluation of curling. The rounded piece was defined as "unmeasurable". The results are shown in Table 1 below.

Haze

A haze meter HR300 (trade name, manufactured by Murakami Color Research Laboratory) was used to measure haze according to JIS K 7136 (1981 version) (haze (cloudiness)). The results are shown in Table 1 below.

Flexibility

A hard-coated film was wound directly on metal rolls having different diameters from each other, with its transparent plastic film substrate placed inside, and the presence or absence of cracking in the hard-coating layer (or antireflection layer) was visually determined. The diameter where no cracking occurred was used as the value of flexibility. The results are shown in Table 1 below.

Pencil Hardness

A hard-coated film was placed on a glass plate, with the surface on which the hard-coating layer was not formed facing downward. Then the surface of the hard-coating layer was subjected to a pencil hardness test according to JIS K-5400 (with a load of 500 g). Thus, the pencil hardness thereof was measured. The results are shown in Table 1 below.

Reflectance

A black acrylic plate (2.0 mm in thickness, manufactured by Mitsubishi Rayon Co., Ltd.) was bonded to the hard-coated film surface on which no hard-coating layer was formed, with an approximately 20-μm thick adhesive layer formed thereon. This eliminated reflection at the back surface of the hard-coated film. This hard-coated film was measured for reflectance of the surface of the hard-coating layer. The spectral reflectance (specular reflectance+diffuse reflectance) was measured using a spectrophotometer UV2400PC (trade mark, with an 8°-inclined integrating sphere, manufactured by Shimadzu Corporation). The reflectance was calculated according to the formula: C illuminant/total reflection index of 2° visual field (Y value). The results are shown in Table 1 below.

(1) The sample was cut into a piece of at least 25 mm width and at least 100 mm length. This was placed on a glass plate and then was measured for initial haze value.

(2) Steel wool #0000 was uniformly attached onto a smooth cross section of a cylinder with a diameter of 25 mm. The cylinder with the steel wool was reciprocated 100 times at a speed of approximately 100 mm/sec on the surface of the sample under a load of 1.5 kg. Then the haze value of the sample was determined after the test.

(3) The value obtained by subtracting the initial haze value from the haze value after the test was used as an index of scratch resistance. The results are shown in Table 1 below. The more the surface of the hard-coating layer or the antireflection layer is scratched in the steel wool test, the larger the haze value obtained after the test, i.e. the larger the difference from the initial haze value. Accordingly, in this evaluation, it can be judged that the larger the difference between the haze value obtained after the test and the initial haze value, i.e. the larger the value of the index of scratch resistance, the lower the scratch resistance, while the smaller the value of the index, the higher the scratch resistance.

Adhesion

The adhesion of the hard-coating layer to the transparent plastic film substrate was evaluated by performing the cross-cut adhesion test according to JIS K 5400. The peeling test was performed 100 times. The number of detached portions of the hard-coating layer from the transparent plastic film substrate was counted. The results are shown in the form of the number of detachment/100 in Table 1 below.

TABLE 1

| | Refractive Index of Film Substrate | Refractive Index of Hard-Coating Layer | Thickness of Hard-Coating Layer (μm) | Reflectance (%) | Pencil Hardness | Curling (mm) | Flexibility (mm φ) | Haze | Adhesion | Scratch Resistance |
|---|---|---|---|---|---|---|---|---|---|---|
| Example 1 | 1.48 | 1.51 | 20 | 4 | 4H | 22 | 9.5 | — | 0/100 | 0.2 |
| Example 2 | 1.48 | 1.51 | 15 | 4 | 4H | 15 | 9.5 | — | 0/100 | 0.2 |
| Example 3 | 1.48 | 1.51 | 25 | 4 | 4H | 30 | 11 | — | 0/100 | 0.2 |
| Example 4 | 1.48 | 1.51 | 20 | 4 | 4H | 10 | 8 | — | 0/100 | 0.4 |
| Example 5 | 1.48 | 1.51 | 20 | 4 | 5H | 29 | 14 | — | 0/100 | 0.2 |
| Example 6 | 1.48 | 1.51 | 20 | 4 | 4H | 20 | 9.5 | 60 | 0/100 | 0.2 |
| Example 7 | 1.48 | 1.51 | 20 | 2.5 | 4H | 10 | 9.5 | — | 0/100 | 0.3 |
| Example 8 | 1.48 | 1.51 | 20 | 1.6 | 4H | 10 | 9.5 | — | 0/100 | 0.3 |
| Example 9 | 1.48 | 1.51 | 30 | 4 | 5H | 36 | 12.5 | — | 0/100 | 0.2 |
| Example 10 | 1.48 | 1.51 | 10 | 4 | 3H | 10 | 8 | — | 0/100 | 0.4 |
| Example 11 | 1.48 | 1.51 | 20 | 4 | 4H | 24 | 9.5 | — | 10/100 | 0.2 |
| Example 12 | 1.48 | 1.51 | 20 | 4 | 4H | 0 | 9.5 | — | 0/100 | 0.2 |
| Example 13 | 1.48 | 1.51 | 20 | 4 | 4H | 0 | 9.5 | — | 0/100 | 0.2 |
| Example 14 | 1.48 | 1.51 | 20 | 4 | 4H | 22 | 9.5 | — | 0/100 | 0.5 |
| Example 15 | 1.48 | 1.53 | 20 | 4 | 4H | 29 | 14 | — | 0/100 | 0 |
| Example 16 | 1.48 | 1.53 | 20 | 4 | 4H | 27 | 14 | — | 0/100 | 0 |
| Example 17 | 1.48 | 1.51 | 29 | 4 | 5H | 28 | 12.5 | 63 | 0/100 | 0.2 |
| Comparative Example 1 | 1.48 | 1.51 | 20 | 4 | 5H | Limiting Value or more | 15.5 | — | 10/100 | 1.8 |
| Comparative Example 2 | 1.48 | 1.51 | 20 | 4 | 3H | 0 | 11 | — | 0/100 | 1.4 |
| Comparative Example 3 | 1.48 | 1.51 | 20 | 4 | 3H | 20 | 12.5 | — | 0/100 | 0.8 |

Refractive Index of Hard-Coating Layer

The refractive index of a hard-coating layer was measured using a multiwavelength Abbe refractometer (manufactured by Atago Co., Ltd., trade name: DR-M2/1550). The results are shown in Table 1 below.

Scratch Resistance

The value corresponding to the degree of scratch resistance of the hard-coated film was determined by the following test procedure. The results are shown in Table 1 below.

As shown in Table 1, the hard-coated films of the examples were excellent in all the properties of hardness, scratch resistance, adhesion, and flexibility and in addition, were effectively prevented from curling. On the other hand, the hard-coated film of Comparative Example 1 had poor scratch resistance and curling properties, while the hard-coated films of Comparative Examples 2 and 3 had a lower hardness and poor scratch resistance.

In Comparative Examples 1 to 3, hard-coated films were formed using a mixed solvent of a butyl acetate and MIBK (butyl acetate:MIBK=46:54) or a mixed solvent of butyl acetate and butyl alcohol (butyl acetate butyl alcohol=46:54), and adhesion thereof was evaluated. As a result, the adhesion was 75/100 or 100/100, i.e. the hard-coated films had poor adhesion and detachment occurred.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hard-coated film, comprising:
   a transparent plastic film substrate; and
   a hard-coating layer formed on at least one surface of the transparent plastic film substrate,
   wherein the hard-coating layer is formed using a material for forming the hard-coating layer containing Component A, Component B, and Component C,
   where Component A is at least one of urethane acrylate and urethane methacrylate,
   Component B is at least one of polyol acrylate and polyol methacrylate, and
   Component C is a polymer or copolymer that is formed of at least one of Components C1 and C2, or a mixed polymer of the polymer and the copolymer,
   where Component C1 is alkyl acrylate having an alkyl group containing at least one of a hydroxyl group and an acryloyl group, and
   Component C2 is alkyl methacrylate having an alkyl group containing at least one of a hydroxyl group and an acryloyl group.

2. The hard-coated film according to claim 1, wherein Component B contains at least one of pentaerythritol triacrylate and pentaerythritol tetraacrylate.

3. The hard-coated film according to claim 1, wherein Component C contains a polymer or copolymer containing a repeating unit, or a mixture of the polymer and the copolymer, and the repeating unit is represented by General Formula (1) indicated below:

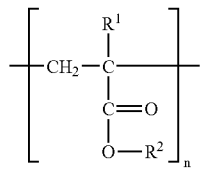

(1)

wherein in General Formula (1), $R^1$ denotes —H or —$CH_3$, $R^2$ indicates —$CH_2CH_2OX$ or a group that is represented by General Formula (2) indicated below:

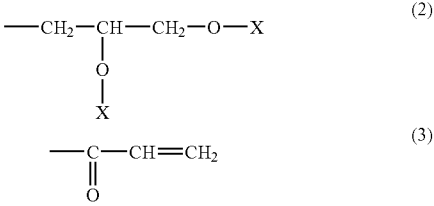

wherein X denotes —H or an acryloyl group that is represented by General Formula (3) above, and Xs are identical to or different from each other.

4. The hard-coated film according to claim 1, wherein the hard coating layer has an uneven outer surface.

5. The hard-coated film according to claim 1, further comprising an antireflection layer formed on an outer surface of the hard coating layer.

6. The hard-coated film according to claim 5, wherein the antireflection layer contains:
   a siloxane oligomer with an ethylene glycol-equivalent number average molecular weight of 500 to 10000; and
   a fluorine compound having a polystyrene-equivalent number average molecular weight of at least 5000 and having a fluoroalkyl structure and a polysiloxane structure.

7. The hard-coated film according to claim 5, wherein the antireflection layer contains hollow spherical silicon oxide ultrafine particles.

8. The hard-coated film according to claim 1, wherein the material for forming the hard-coating layer contains a leveling agent.

9. An optical device, comprising:
   an optical component; and
   a hard-coated film according to claim 1 formed on at least one surface of the optical component.

10. An image display, comprising a hard-coated film according to claim 1.

11. An image display, comprising an optical device according to claim 9.

* * * * *